July 16, 1946.　　　A. C. DURDIN, 3D　　　2,404,223
METHOD OF AND APPARATUS FOR TREATING SEWAGE
Filed March 2, 1942　　2 Sheets-Sheet 1
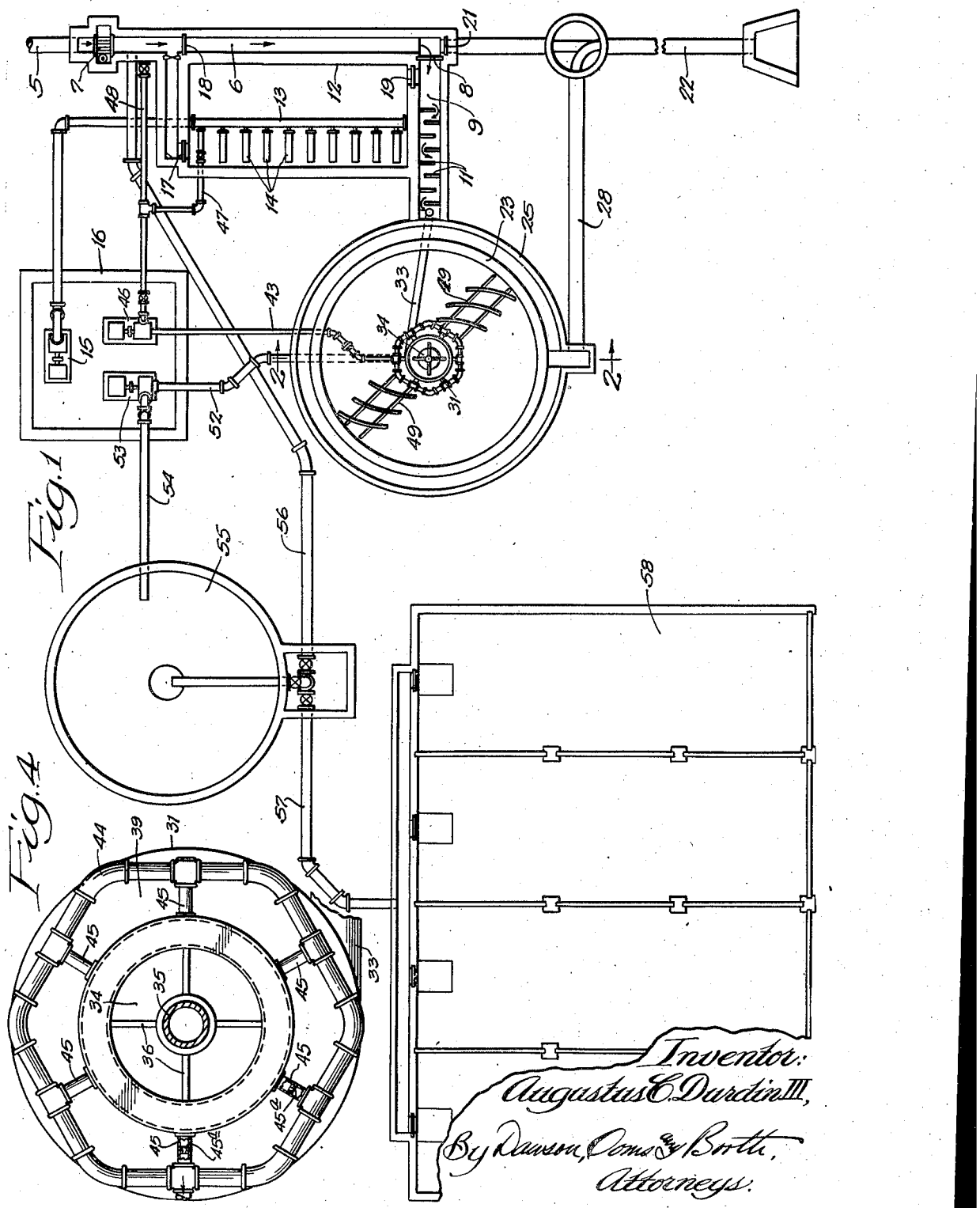

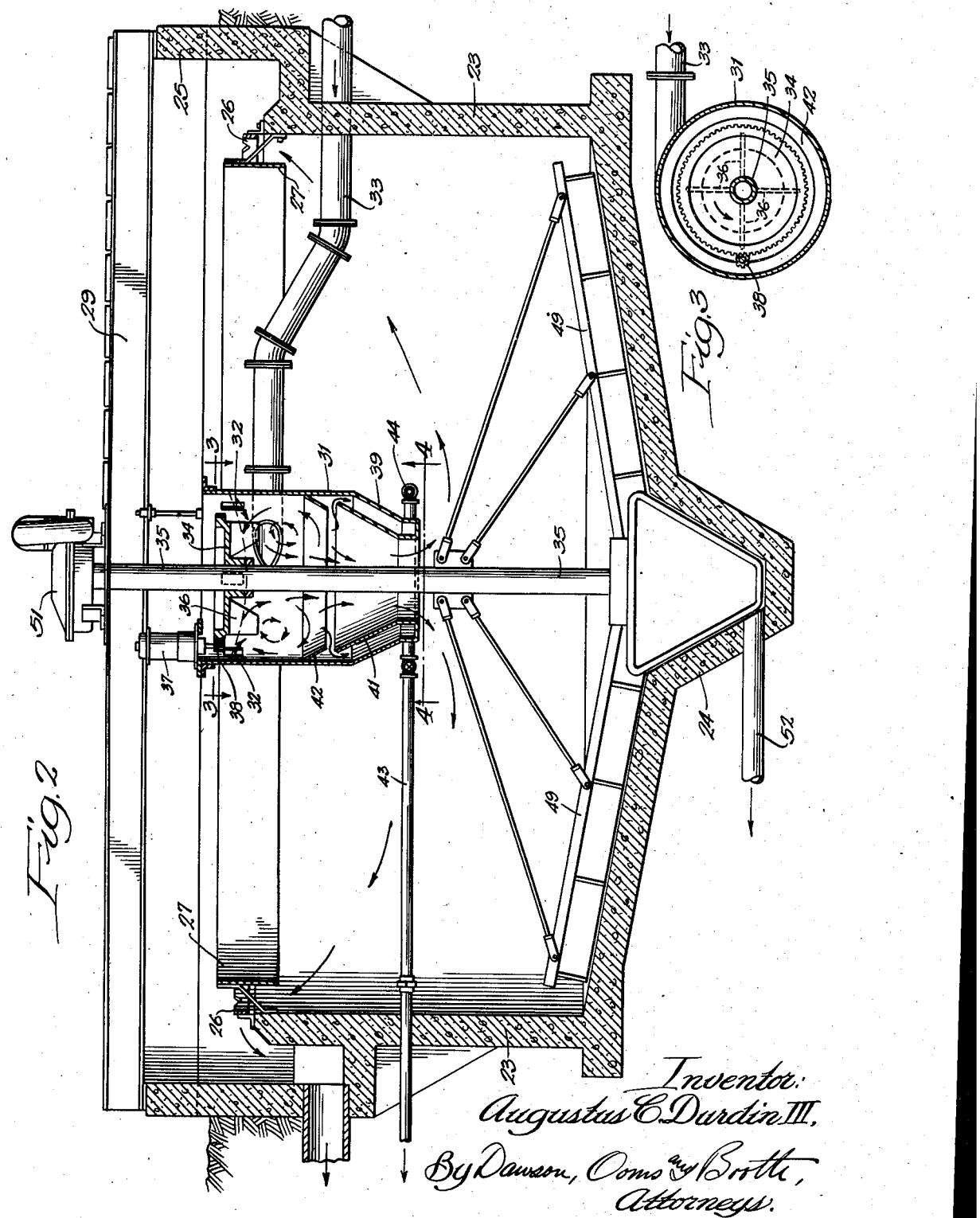

Patented July 16, 1946

2,404,223

UNITED STATES PATENT OFFICE 2,404,223

METHOD OF AND APPARATUS FOR TREATING SEWAGE

Augustus C. Durdin, III, Skokie, Ill., assignor of twenty-four per cent to Lewis H. Durdin, Franklin, Pa., and fifty-two per cent to Augustus C. Durdin, Jr.

Application March 2, 1942, Serial No. 432,929

19 Claims. (Cl. 210—8)

This invention relates to method of and apparatus for treating sewage, and more particularly to the treatment of sewage by an activated sludge process.

In carrying out the activated sludge process, I have found that the lighter flocs or sludge particles contain a more virile bacterial life than the heavier flocs or solids in the sewage. I have further found that sewage containing these lighter flocs is capable of carrying a much greater amount of oxygen than sewage which also contains the heavier solids. It is accordingly one of the principal objects of the present invention to provide a method of and apparatus for treating sewage in which a portion of the treated sewage containing the lighter flocs is separated and utilized in the treatment of raw sewage.

Another object of the invention is to provide a method of and apparatus for treating sewage by an activated sludge process in which raw sewage is inoculated with virile and aerobic sludge from an aeration chamber.

Another object of the invention is to provide a method of and apparatus for treating sewage in which the highly virile and aerobic sludge in a sewage-sludge mixture can be classified and separated from the mixture under positive control.

Still another object of the invention is to provide a method of and apparatus for treating sewage in which an aerated sludge is intimately mixed with raw sewage for a definite period of time, during which the raw sewage is substantially stabilized. According to one feature of the invention, relatively short aeration and settling periods may be employed to effect a substantially eighty percent reduction in the biological oxygen demand of the sewage.

Still another object of the invention is to provide a method of and apparatus for treating sewage in which the sludge is classified to develop a strain of organisms which will adapt themselves to a short cycle of dosing and revitalization by aeration.

A further object of the invention is to provide a method of and apparatus for treating sewage in which a chemically weighted sludge can readily be flocculated and classified to establish the environment necessary to promote propagation of the desired organism.

The above and other objects, advantages and novel features of the invention will be apparent from the following description when read in connection with the accompanying drawings, in which:

Figure 1 is a diagrammatic plan view of a complete sewage treatment plant embodying the invention;

Figure 2 is an enlarged section on the line 2—2 of Figure 1;

Figure 3 is a partial section on the line 3—3 of Figure 2; and

Figure 4 is a plan view on the line 4—4 of Figure 2.

The plant shown in Figure 1 comprises an inlet pipe 5 for raw sewage, opening into a channel 6. Preferably, the comminutor indicated at 7 is provided in the channel to comminute solids in the incoming sewage, although this may be omitted if desired. The channel 6 communicates over a weir 8 with a mixing chamber 9 containing a series of alternately arranged vertical baffles 11 providing a tortuous path through the mixing chamber. An aeration tank 12 is provided adjacent the channel 6 and contains aerating means illustrated as comprising a header 13 to which are connected a plurality of porous pipes 14, arranged along one side of the tank. Air may be supplied to the header 13 by a pump 15 in a pump housing 16.

The aeration tank is provided with a raw sewage inlet 17 controlled by a weir, and a similar weir 18 may be mounted in the sewage channel 6. By adjusting the relative heights of the weirs 17 and 18, any desired proportion of the raw sewage entering through the pipe 5 may be conducted into the aeration chamber. The aeration chamber has an outlet, preferably also controlled by a weir 19, discharging into the mixing chamber 9, so that aerated sludge from the aeration chamber will mix therein with raw sewage flowing through the channel 6. Preferably, an overflow weir 21 is provided, connecting the channel 6 directly with a waste pipe 22, so that in the event of unusually high flows, a portion of the sewage will be by-passed directly to the waste pipe.

The sewage mixture from the mixing chamber 9 is conducted to a settling tank, indicated generally at 23, and illustrated more particularly in Figure 2. As shown in this figure, the settling tank comprises a cylindrical tank 23 formed with a sloping bottom terminating in a central sludge hopper 24, and formed around its upper edge with an effluent channel 25. Flow from the tank into the effluent channel may be controlled by a weir 26 having a baffle 27 spaced inwardly therefrom to prevent scum, grease and the like accumulating in the tank from flowing into the channel. Clear effluent collecting in the channel may be withdrawn through an effluent pipe 28 communicating with the waste pipe 22.

A supporting bridge, formed by beams 29 extending diametrically across the tank, supports in the central portion thereof a classifier for classifying the mixed treated sewage entering the settling tank. As shown, the classifier comprises a substantially cylindrical shell 31 mounted centrally of the settling tank with its axis vertical. The major portion of the shell is adapted to be submerged in liquid in the settling tank, and openings 32 may be provided in the upper part of the shell to permit scum or the like to flow directly from the shell into the settling tank. Mixed material from the mixing chamber enters the settling tank through a pipe 33 connected tangentially to the shell 31 to discharge the sewage mixture into the shell.

The tangential discharge of the liquid into the shell will, of itself, tend to establish a rotary flow therein. However, as the discharge is normally at a relatively low velocity, means are provided, according to the invention, to accentuate this flow so that it can be regulated to classify the sludge in the desired manner. As shown, this means comprises a circular disc 34 rotatably mounted on a shaft 35, extending axially through the shell and settling tank. On its lower face, the disc 34 carries a plurality of radial blades 36 projecting into the liquid in the shell and adapted to cause a circulation thereof as the disc is rotated. A motor 37 mounted above the shell drives a pinion 38 meshing with gear teeth on the periphery of the disc to drive the disc. Preferably, the motor 37 is of a variable speed type or drives the disc through a variable speed transmission so that the speed of rotation of the disc can be adjusted as desired.

At its lower portion, the shell converges slightly as shown at 39, and is formed with an inwardly and upwardly extending baffle 41, spaced from the inner wall of the shell to provide an annular collection chamber having an open annular mouth at its top. A baffle 42 preferably overlies the mouth to leave an annular peripheral inlet from the interior of the shell to the collection chamber. Material collected in the chamber is adapted to be withdrawn through a pipe 43 connected to an annular outlet manifold 44 surrounding the chamber and communicating therewith at a plurality of spaced points through outlet pipes 45. Orifice plates 45a are preferably placed in the pipes 45 to insure a substantially uniform flow through the several pipes as shown in Figure 4. In this way, material is withdrawn from the annular chamber substantially uniformly throughout its circumference to prevent the formation of any dead spaces or pockets therein, in which separated material might collect.

The pipe 43 is connected to the inlet of a pump 46 in the pump house 16, and the outlet of this pump is connected through branch pipes 47 and 48 with the aeration chamber and the influent channel 6 respectively. The pipes 47 and 48 are provided with regulating means such as valves by which the proportionate flow therethrough may be adjusted or by which either of the pipes may be closed.

Sludge collecting on the bottom of the settling tank 23 is adapted to be scraped into the hopper 24 by means of a scraper carried by the shaft 35. As shown, the scraper comprises a plurality of radially extending arms or bars 49, supported on the shaft 35 and closely overlying the bottom of the settling tank. The shaft 35 may be rotated by a motor 51 connected to the shaft either directly or through a suitable speed reducing transmission, so that when the shaft is turned the scrapers will loosen material accumulating on the bottom of the settling tank and scrape it into the hopper 24.

Material collecting in the hopper 24 may be removed therefrom through a pipe 52 connected to a pump 53 in the pump house 16. The pump discharges through a pipe 54 into a digester 55 of any desired type, in which the sludge is completely digested. Liquid from the digester may be returned through pipe 56 to the inlet channel 6 and digested material may be forced therefrom through a pipe 57 to a drying bed, indicated at 58.

The apparatus as described is capable of being operated in several different ways in order to effect a more or less complete treatment of the sewage, and in accordance with the volume of sewage to be treated. According to one desired method, the branch pipe 48 is closed so that all of the classified sludge returned through the pipe 43 will be discharged into the aeration chamber. The weirs 17 and 18 may also be adjusted so that all of the raw incoming sewage will flow directly to the mixing chamber. With the apparatus adjusted in this manner, the return sludge conducted from the classifier through the pipe 43 will be aerated in the aeration chamber and will be discharged therefrom over the weir 19 to mix with the raw sewage in the mixing chamber 9. As pointed out above, the return sludge containing only the lighter flocs supports more virile bacterial life than the heavier sludge and is also capable of absorbing a greater amount of oxygen. When this aerated sludge is admitted to the raw sewage in the mixing chamber, it is thoroughly mixed therewith due to the action of the baffles 11. I have found that only a relatively short detention period is necessary in order to effect substantially an eighty percent reduction in the biological oxygen demand of the raw sewage.

After flowing thru the mixing chamber the mixture passes thru the pipe 33 into the classifier shell 31. The tangential entrance of the liquid in the shell creates a circulation therein and the stirring device 34 serves to accentuate the circulation so that any desired velocity may be maintained in the classifier. The speed of the stirring device 34 is preferably adjusted to be only slightly in excess of the rotating velocity of the mixture so that no turbulences will be created around the blades of the stirring device.

This operation causes the mixture to rise higher adjacent the outside of the shell than adjacent its center so that liquid at the upper part of the shell tends to flow inwardly from the outside toward the center. This creates a toroidal swirling action in the liquid as indicated by the arrows in Figure 2 and the heavier particles flow to the outside of the toroidal swirl while the lighter particles tend to collect at the interior thereof. When the heavier particles reach the central part of the shell they are flowing downwardly toward the outlet and since there is a normal flow thru the outlet at the bottom of the shell the heavier particles tend to flow directly down the central part of the shell and out its open bottom. By the time the material has reached the lower part of the shell, adjacent the baffle 41, only the lighter flocs are left in the liquid to be withdrawn thru the chamber formed by the baffle 41. From this chamber the lighter flocs are returned thru the pipe 43 to the aeration chamber to be aerated and re-vitalized and to have the oxygen supply replenished.

The sewage flowing out the bottom of the classifier into the settling tank settles therein, the liquid separating and flowing over the weir 26 to the outlet pipe 28. The sludge collecting in the bottom of the settling tank may be pumped to the digester or may be disposed of in any other desired manner.

Instead of aerating only the return sludge, it may be desired under some conditions to mix with the return sludge a portion of the raw sewage before aerating it. For this purpose, the weirs 17 and 18 may be adjusted to by-pass any desired amount of raw sewage into the aeration tank to be mixed with the return sludge and aerated therein. It may also be desired under some conditions to add a portion of the return sludge to the raw sewage prior to re-aeration of the sludge. For this purpose, the conduit 48 may be opened so that a part of the return sludge will flow directly into the raw sewage channel 10 adjacent the inlet thereof. This operation provides a longer detention period for the activated sludge to react with the raw sewage.

In the case of sewage containing substantial quantities of industrial waste, it may be necessary or desirable to more or less neutralize chemical conditions in the sludge prior to treatment. When this is necessary, chemical agents, such, for example, as lime or the like may be added to the sewage adjacent the inlet end of the channel 6 to adjust the pH of the sewage to the desired value to permit propagation of the organisms in the sludge. Any chemical values in the sludge which are not completely neutralized will result in lighter precipitates or chemical bodies than those which are completely neutralized, and will be withdrawn with the light flocs in the classifier. These unused or un-neutralized chemical values will thus be returned to the inlet of the system to assist in adjusting the pH of the fresh sewage in such a way as to establish the desired environment for proper growth of the organisms. In treating sewage of this character, it may be desired to return at least a portion of the classified sludge directly to the inlet channel through the pipe 48.

While one embodiment of the invention has been shown and described in detail, it will be understood that this is illustrative only and is not to be taken as a definition of the scope of the invention, reference being had for this purpose to the appended claims.

What is claimed is:

1. The method of treating sewage which comprises mixing incoming sewage with activated sludge maintaining the sewage and sludge mixed without the addition of air thereto a time sufficient to allow the sludge to react with the sewage, separating from the mixture a portion thereof containing the lighter flocs, aerating the separated portion, and utilizing the separated portion as the activated sludge to be mixed with incoming sewage.

2. The method of treating sewage which comprises mixing incoming sewage with activated sludge maintaining the sewage and sludge mixed without the addition of air thereto a time sufficient to allow the sludge to react with the sewage, separating from the mixture a portion thereof containing the lighter flocs, mixing with the separated portion a part of the incoming sewage, aerating the mixture, and utilizing the aerated mixture as the activated sludge to be mixed with the remaining incoming sewage.

3. The method of treating sewage which comprises mixing incoming sewage with activated sludge, flowing the mixture through a tortuous path without the addition of air thereto thoroughly to mix the sludge and sewage so that the sludge will react with the raw sewage, separating from the mixture a portion thereof containing the lighter flocs, aerating the separated portion, and utilizing the aerated portion as the activated sludge to be mixed with incoming sewage.

4. The method of treating sewage which comprises mixing incoming sewage with activated sludge, confining the mixture and rotating it to set up a toroidal flow, adding additional mixture to the confined body while maintaining the circulation, withdrawing from the outside of the confined body a portion thereof containing the lighter flocs, aerating the withdrawn portion, and utilizing the aerated portion as the activated sludge to be mixed with incoming sewage.

5. Apparatus for treating sewage comprising means forming a channel for incoming sewage, an aeration tank having an inlet and an outlet, means in the tank for aerating sewage therein, the outlet of the tank communicating with the channel to mix the aerated sludge therefrom with the incoming sewage, means in the channel to maintain the sludge and sewage mixed without the addition of air thereto, a classifier receiving the mixture and including means to separate therefrom the portion containing the lighter flocs, and means to conduct said separated portion to the inlet of the aeration tank.

6. Apparatus for treating sewage comprising means forming a channel for incoming sewage, an aeration tank, means in the tank for aerating sewage therein, a connection from the channel to the tank to conduct a portion of the incoming sewage into the tank, an outlet from the tank communicating with the channel to conduct the aerated sludge into the channel to mix with the remaining incoming sewage, means in the channel to maintain the sludge and sewage mixed without the addition of air thereto, a classifier receiving the mixture and including means to separate therefrom the portion containing the lighter flocs, and means to conduct the separated portion to the aeration tank.

7. Apparatus for treating sewage comprising means forming a channel for incoming sewage, an aeration tank, means in the tank for aerating sewage therein, a mixing chamber communicating with the channel and the tank to mix material received therefrom without the addition of air thereto, the mixing chamber including baffles providing a tortuous flow path thoroughly to mix the material flowing therethrough, a classifier receiving the mixture from the mixing chamber and including means to separate therefrom the portion containing the lighter flocs, and means for returning the separated portion to the aeration tank.

8. Apparatus for treating sewage comprising an inlet channel for sewage to be treated, a mixing chamber connected to the channel, an aeration tank having an inlet connection from the inlet channel and an outlet connection to the mixing chamber, means to control the proportions of incoming sewage flowing from the inlet channel to the mixing chamber and the aeration tank, a classifier connected to the mixing chamber including means to separate a portion of the mixture containing the lighter flocs, conduits for conducting the separated portion to the aeration tank and to the inlet channel, and means to control the proportions of the separated portion conducted respectively to the inlet channel and the tank.

9. Apparatus for treating sewage comprising an inlet channel for sewage to be treated, a mixing chamber connected to the channel, an aeration tank having an inlet connection from the inlet channel and an outlet connection to the mixing chamber, means to control the proportions of incoming sewage flowing from the inlet channel to the mixing chamber and the aeration tank, a classifier connected to the mixing chamber including means to separate a portion of the mixture containing the lighter flocs, conduits for conducting the separated portion to the aeration tank and to the inlet channel, means to control the proportions of the separated portion conducted respectively to the inlet channel and the tank, said classifier also including means to separate the solids from the liquid in the remaining part of the mixture, and means for separately withdrawing from the classifier the separated solids and liquid.

10. Apparatus for treating sewage comprising an inlet channel for sewage to be treated, a mixing chamber connected to the channel, an aeration tank having an outlet communicating with the mixing chamber, a settling tank, a classifier in the settling tank having a tangential inlet communicating with the mixing chamber and an outlet in its bottom opening into the settling tank, stirring means in the classifier to cause a circulation of the mixture therein, means for rotating the stirring means, means forming a second outlet in the classifier adjacent the periphery thereof to withdraw a portion of the mixture containing the lighter flocs, and means to return said separated portion to the aeration tank.

11. Apparatus for treating sewage comprising an inlet channel for sewage to be treated, a mixing chamber connected to the channel, an aeration tank having an outlet communicating with the mixing chamber, a settling tank, a classifier in the settling tank having a tangential inlet communicating with the mixing chamber and an outlet in its bottom opening into the settling tank, stirring means in the classifier to cause a circulation of the mixture therein, means for rotating the stirring means, means forming a second outlet in the classifier adjacent the periphery thereof to withdraw a portion of the mixture containing the lighter flocs, means to return said separated portion to the aeration tank, means forming a liquid outlet adjacent the top of the settling tank, and means to remove settled sludge from the bottom of the settling tank.

12. In apparatus for treating sewage, separating means for a sewage mixture containing activated sludge, comprising a tank adapted to contain a sewage mixture and having a liquid outlet adjacent its top and a settled sludge outlet in its lower portion, a substantially cylindrical shell arranged vertically in the central portion of the tank with its bottom opening into the tank, an inlet pipe for sewage mixture connected to the shell, stirring means including a substantially radial blade extending into the shell and rotatable around the axis thereof, means for rotating the stirring device, and means in the shell forming an outlet adjacent its periphery for a portion of the mixture containing the lighter solids.

13. In apparatus for treating sewage, separating means for a sewage mixture containing activated sludge comprising a tank adapted to contain a sewage mixture and having a liquid outlet adjacent its top and a settled sludge outlet in its lower portion, a substantially cylindrical shell arranged vertically in the central portion of the tank with its bottom opening into the tank, an inlet pipe for sewage mixture connected to the shell, a disc rotatably mounted in the upper part of the shell, a plurality of substantially radial blades on the disc projecting into the shell, means to drive the disc to set up a circulation of liquid in the shell, and means in the shell forming a liquid outlet adjacent its periphery for a portion of the mixture containing the lighter solids.

14. In apparatus for treating sewage, separating means for a sewage mixture containing activated sludge comprising a tank adapted to contain a sewage mixture and having a liquid outlet adjacent its top and a settled sludge outlet in its lower portion, a substantially cylindrical shell arranged vertically in the central portion of the tank with its bottom opening into the tank, an inlet pipe for sewage mixture connected to the shell, a scraper in the lower part of the tank to scrape collected sludge toward the outlet, a shaft extending vertically through the tank and through the shell to drive the scraper, a stirring device rotatably mounted on the shaft in the shell to cause a circulation of liquid in the shell, means to drive the stirring device, and means in the shell forming a liquid outlet adjacent its periphery.

15. In apparatus for treating sewage, a sewage classifier comprising a substantially cylindrical shell arranged with its axis vertical and having an open lower end, a sewage inlet pipe connected tangentially to the shell, a stirring device mounted in the shell for rotation about a vertical axis and having substantially radial blades for causing a circulation of liquid in the shell, means for rotating the stirring device, means in the shell forming an annular chamber communicating with the shell adjacent its periphery, an annular outlet manifold surrounding the annular chamber, and a plurality of pipes establishing communication between the manifold and the chamber.

16. The method of treating sewage which comprises directing a part of said sewage through a mixing and agitating zone and then a settling zone, collecting sludge in said settling zone and delivering it to an aerating zone, aerating said sludge in said aerating zone, directing some sewage before it reaches said mixing and aerating zone and delivering it to said aerating zone for aeration with said sludge, and delivering the said aerated sewage and sludge to said mixing and agitating zone for mixing and agitating therein with the incoming sewage.

17. The method of treating sewage which comprises creating a main flow of sewage, directing said main flow through a settling tank, removing the sludge, aerating said sludge in an aerator functionally removed from the main sewage flow, feeding sewage from said main flow to said aerator, and delivering the effluent from said aerator to the main sewage flow before it flows into said settling tank.

18. A sewage system including a mixer, means feeding sewage to said mixer, a settling tank, means feeding sewage to said settling tank from said mixer, an aerator, means feeding sludge from said settling tank to said aerator, means also feeding sewage from said mixer feeding means to said aerator, and means feeding the output of said aerator to said mixer.

19. A sewage system including a settling tank, means directing sewage to said tank, an aerator, means feeding sludge from said settling tank to said aerator, means also feeding sewage from said first named means to said aerator, and means feeding the output of said aerator to said first named means.

AUGUSTUS C. DURDIN, III.